United States Patent
Gardell et al.

(10) Patent No.: US 6,298,062 B1
(45) Date of Patent: Oct. 2, 2001

(54) SYSTEM PROVIDING INTEGRATED SERVICES OVER A COMPUTER NETWORK

(75) Inventors: Steven E. Gardell, North Andover; Israel B. Zibman, Newton, both of MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/178,178

(22) Filed: Oct. 23, 1998

(51) Int. Cl.[7] .................................................. H04J 3/02
(52) U.S. Cl. .................... 370/401; 370/230; 370/237; 370/352; 370/395; 370/465; 379/201
(58) Field of Search ......................... 370/230, 237, 370/252, 351, 352, 401, 402, 412, 465, 466, 467, 379, 381, 382, 383, 384, 400, 395; 358/400, 425; 379/201, 220, 230

(56) References Cited

U.S. PATENT DOCUMENTS

| | | | |
|---|---|---|---|
| 4,885,739 | * 12/1989 | Read et al. | 370/401 |
| 5,042,027 | * 8/1991 | Takase et al. | 370/252 |
| 5,291,302 | * 3/1994 | Gordon et al. | 358/400 |
| 6,031,896 | * 2/2000 | Gardell et al. | 370/352 |
| 6,069,890 | * 5/2000 | White et al. | 370/352 |
| 6,122,357 | * 9/2000 | Farris et al. | 379/201 |
| 6,122,363 | * 9/2000 | Friedlander et al. | 379/201 |

OTHER PUBLICATIONS

Labriola, Don, "Here's Looking at You," Computer Shopper, Sep. 1997, p. 335–362.

Kahane, Opher et al., Call Management Agent System: Requirements, Function, Architecture and Protocol, IMTC VoIP Forum Contribution, Jan. 15, 1997, 44 pages.

* cited by examiner

*Primary Examiner*—Douglas Olms
*Assistant Examiner*—Shick Hom
(74) *Attorney, Agent, or Firm*—Leonard Charles Suchyta; James K. Weixel (57) ABSTRACT

A telecommunications system operating over a packet-based network that enable calls seeking to connect with an unavailable destination to be completed, and for the intended called party to elect the call disposition on either a call-by-call basis, or for all incoming calls. Automatic disposition of incoming calls is performed in the event that the user does not elect such disposition to make use of the interactive interface for call disposition.

36 Claims, 6 Drawing Sheets

SYSTEM PROVIDING INTEGRATED SERVICES OVER A COMPUTER NETWORK

RELATED APPLICATIONS FILED CONCURRENTLY HEREWITH

This invention is related to the following inventions, all of which are filed concurrently herewith and assigned to the assignee of the rights in the present invention: Ser. No. 06/105,326, of Gardell et al. entitled "A HIGH SPEED COMMUNICATIONS SYSTEM OPERATING OVER A COMPUTER NETWORK"; Ser. No. 09/177,712, of Gardell et al. entitled "MULTI-LINE TELEPHONY VIA NETWORK GATEWAYS"; Ser. No. 09/178,130, of Gardell et al. entitled "NETWORK PRESENCE FOR A COMMUNICATIONS SYSTEM OPERATING OVER A COMPUTER NETWORK"; Ser. No. 09/178,271, of Gardell et al. entitled "SPEAKER IDENTIFIER FOR MULTI-PARTY CONFERENCE"; Ser. No. 09/177,415, of Gardell et al. entitled "REAL-TIME VOICEMAIL MONITORING AND CALL CONTROL, now U.S. Pat. No. 6,031,896"; Ser. No. 09/177,700, of Gardell et al. entitled "MULTI-LINE APPEARANCE TELEPHONY VIA A COMPUTER NETWORK".

BACKGROUND OF THE INVENTION

1. Field of the Invention

The present invention generally relates to the field of data transmission over a computer network. More particularly, the invention relates to the provision of integrated communication, information, and transaction services over such a computer network.

2. Description of Related Art

Computer networks which are capable of transmitting data or information between locations, such as local area networks (LANs), wide area networks (WANs), and the Internet, are currently being used to transmit audio information between respective computers of the network. At the transmitting computer, a person's voice is digitized using a conventional analog to digital (A/D) converter and transmitted to the receiving location where it is passed through a conventional digital to analog (D/A) converter and presented as audio.

This type of computer telephony system suffers from several major disadvantages. First, the system is limited to only those people who have access to compatible end-point software and a shared network such as the Internet. In addition, while Internet access has now widely proliferated, it has not reached the near universal accessibility of traditional telephone service over public switched telephone networks (PSTNs) and the like. Thus, such a computer telephony system is totally useless if a user on the Internet desires to communicate with someone who does not have access to the Internet.

On the other hand, IP/PSTN gateways allow people on a computer network, such as the Internet, to communicate with people on a conventional telephone network, such as a PSTN, general switched telephone network (GSTN), integrated services digital network (ISDN), or other switched circuit network (SCN), using, for example, an H.323 protocol. Such gateways provide the appropriate translation between SCN and PBN data formats and between different communication procedures, allowing a user on one system (such as the PSTN) to communicate with a user on an otherwise incompatible system (such as a PBN).

While IP/PSTN gateways and their associated components effectively support communication between two otherwise incompatible networks, current use of those systems has been limited. Those systems are designed to support communication between two parties, and also provide for conferencing of multiple parties in a single call. However, those systems do not presently address the provision of more traditional phone behavior offered in PSTN and other conventional telecommunications networks. This is a significant drawback, especially for those who are already reluctant to convert from conventional telecommunications networks for their telecommunications needs.

As an example, one shortcoming associated with existing computer network-based communications systems is that there is no procedure for intelligently routing or otherwise disposing of an incoming call when a called party is unavailable, such as when the called party is "on-line" or away from his or her terminal.

In addition, with the Internet gaining ever-increasing popularity, many people spend significant amounts of time "on-line" on the Internet every day. In the case of individuals accessing the Internet from their residences, their telephone line is unavailable for receiving telephone calls while they are using the Internet via a dial-up connection. In the case of people who are logged onto the Internet for long periods of time, this can create a significant problem, forcing some people to install a second telephone line simply for accessing the Internet, which is inefficient and undesirable.

Accordingly, it will be apparent to those of ordinary skill in the art that there continues to be a need for a communications system that provides for communication between a party on a packet based network (PBN) and a party on a conventional switched circuit network (SCN), while simultaneously providing various services for handling an incoming call in the event the called party is unavailable, for example when the called party is logged onto the Internet. The present invention addresses these needs and others.

SUMMARY OF THE INVENTION

According to the present invention, a method and apparatus are provided with novel capabilities for telephonic communications over a computer network. The invention provides telecommunications service capabilities in a computer network in instances where the called party is unavailable. A called party is unavailable for the purposes of the present invention when 1) the called party's line is in use, 2) when the called party does not wish to accept a call and has previously informed the network, or 3) when the caller cannot accept a call (i.e., when the call is not answered within a preselected number of rings). The invention is operative in these scenarios to route the incoming calls to service sub-systems offering services such as voice mail services.

The present invention is incorporated in a network-based system to support communication with conventional SCNs, or between computer networks. The network-based system includes a gateway that provides for communication between two dissimilar networks, a signal routing agent that controls operation and transmits signals based upon user profile, and one or more service nodes to selectively receive incoming calls and provide various services. The system is programmed to detect when terminal end-points are unavailable, either when there is no answer at the terminal end-point or when the terminal end-point chooses to be unavailable for a period of time. In either of these events, the system automatically forwards the call to the network-resident service node. Thus, the system provides call routing services for calls originating in a SCN as well as for calls originating in an IP network.

Thus, the present invention in one illustrative embodiment is directed to a communication system for operating over a computer network and for interacting with a switched circuit network, the system comprising: a gateway in communication with the switched circuit network, the gateway being operative to translate switched circuit network-compatible signals into computer network-compatible signals; and a signal routing agent in communication with the gateway and with a plurality of terminal end-points, the signal routing agent being operative to receive incoming calls from the gateway addressed to respective ones of the terminal end-points and programmed to route the calls to the respective terminal end-points, the signal routing agent being responsive to one of the terminal end-points being unavailable to automatically route the corresponding call to a preselected network-resident service sub-system.

A preferred method of the present invention includes the steps of receiving an incoming call addressed to a particular terminal end-point; routing the incoming call to the terminal end-point; determining whether the terminal end-point is unavailable to receive the incoming call; if the terminal end-point is unavailable, determining an appropriate network-resident service sub-system to receive the call; and routing the incoming call to the appropriate service sub-system.

BRIEF DESCRIPTION OF THE DRAWINGS

Other objects, features and advantages of the invention discussed in the above summary of the invention will be more clearly understood from the following detailed description of preferred embodiments, which are illustrative only, when taken together with the accompanying drawings in which.

DETAILED DESCRIPTION OF THE INVENTION

Figure 1:
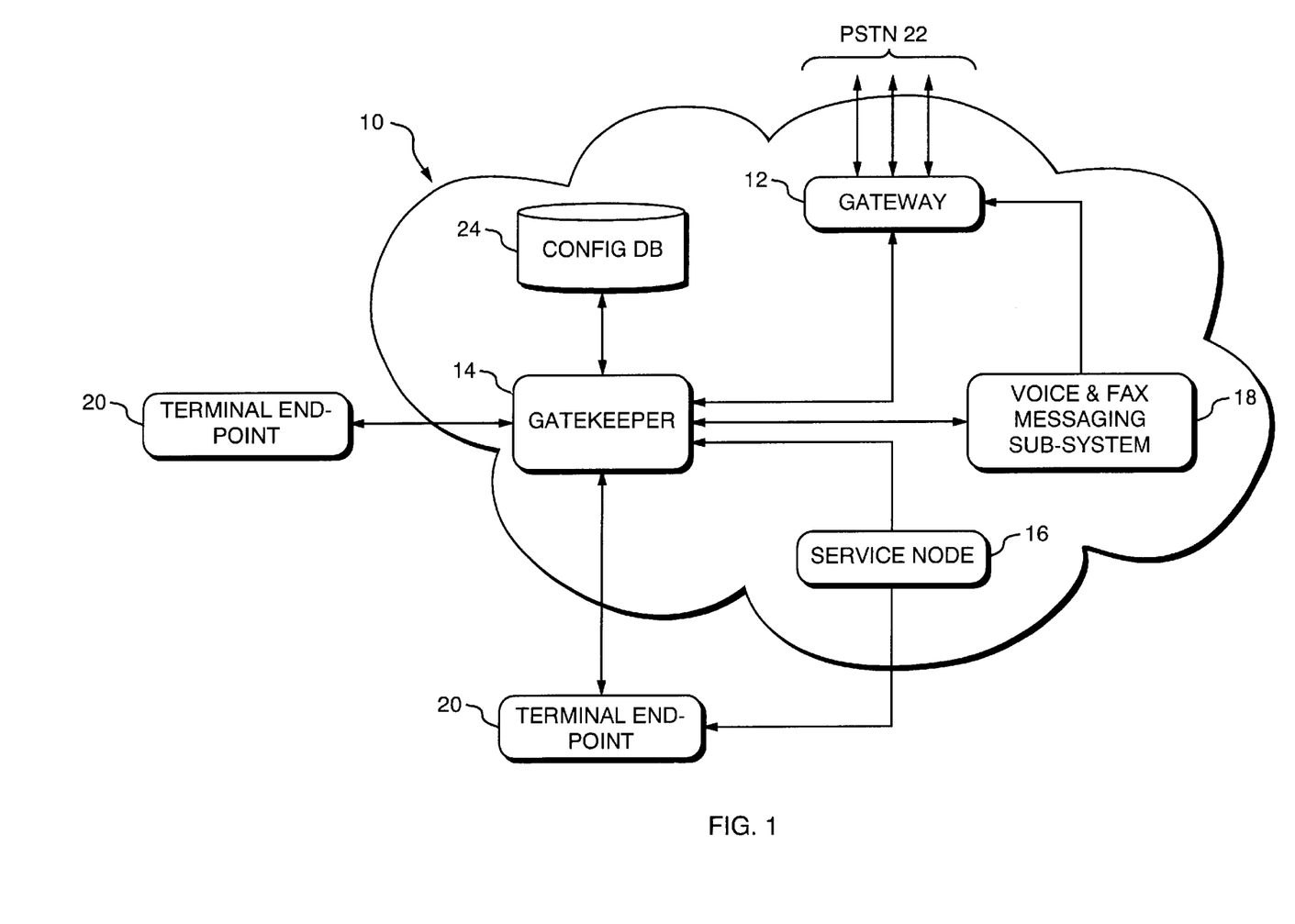
FIG. 1 is a block diagram of a computer network-based communications system comprising one illustrative embodiment of the present invention.

FIG. 1 shows the major components of an intelligent call disposition system 10 according to one illustrative embodiment of the present invention. This system 10 may be incorporated in a high-speed computer-based communications network as described in co-pending U.S. Patent Application Ser. No. 60/105,326, filed on Oct. 23, 1998 and now expired, and entitled "HIGH SPEED COMMUNICATIONS SYSTEM OPERATING OVER A COMPUTER NETWORK", which is incorporated herein by reference. Generally, the call disposition system 10 of the network according to the present invention includes a gateway 12, a signal routing device, for example a gatekeeper 14, a network-resident service node 16, one or more call handling sub-systems 18, and plural terminal end-points 20. In the preferred embodiment, the system 10 is operative to receive plural incoming calls from, for example, a public switched telephone network 22 (PSTN) that seek to establish communication with one or more of the terminal end-points, determine whether the terminal end-point or end-points are available and, if one or more of the end-points are unavailable, route the incoming calls to one of the sub-systems 18 as determined by the network-resident service node 16.

The gateway 12 comprises an H.323-defined entity, and provides signal conversion capabilities between a switched circuit network, for example the PSTN 22, and a PBN, to support communication therebetween. The gateway also allows for interworking with other H-series terminals, GSTN or ISDN voice terminals, or GSTN or ISDN data terminals. The gateway is operative to accept a call originating on, for example, the PSTN 22, to convert the signal to a packet-based format, and to pass it into the gatekeeper 14 of the computer network. The gateway may also perform the opposite function, namely take a call originating at an IP terminal, convert the signal to a PSTN-compatible format, and pass it on to the PSTN 22. The gateway is responsible for passing, in addition to the voice signals, caller-ID data, number-dialed data, and other such information in both directions. Various telephony signaling technologies may be used by the gateway to perform these functions, as are well known to those of ordinary skill in the art.

The gatekeeper 14 provides admissions control and address translation services, and uses a suitable protocol, for example, an H.323 protocol. In addition, the gatekeeper may also be configured to provide call control services and route call control signals to the terminal end-points 20. The gatekeeper is connected to the gateway for communication with the gateway, and initially receives a translated phone number dialed by a caller on the PSTN 22 from the gateway. The gatekeeper accesses a translation table (not shown) to determine the corresponding IP address of the terminal end-point, and coordinates initial call presentation procedures, as described in greater detail below.

The gatekeeper 14 typically includes a gatekeeper server 40 (FIG. 2) in the form of a computer or router that is dedicated to running the gatekeeper. The computer or router is programmed with software to provide H.323 specified gatekeeper functionality.

In one illustrative embodiment, the gatekeeper 14 comprises a call routed gatekeeper to serve as a signal routing agent for the system 10, and is therefore responsible for attempting to connect a caller with a particular terminal end-point 20 (FIG. 1). Alternatively, the system 10 may incorporate a call control service entity ("CCSE") to serve as the signal routing agent. In either case, the signal routing agent is provided with the address of the appropriate terminal end-point for receiving the call, and routes a call setup signal to the terminal end-point in an attempt to complete the call, as is described in greater detail below.

The system 10 further includes the service node 16 (FIG. 1), which is operative to determine whether to present a call to a called end-point or to direct the call to a service sub-system, based upon status of the called party's line and the called party's profile. In the event a called terminal end-point 20 is deemed unavailable, the service node is programmed to access a configuration database 24 to determine the proper service sub-system for receiving the incoming call, as is described in greater detail below. The called party's profile may be established before the incoming call is received, and indicates to the service node the appropriate destination for incoming calls in the event the called party is unavailable.

While the service node 16 is shown in one illustrative embodiment as being a discrete component, it will be apparent that the service node can be contained within the signal routing agent for communication with the signal routing agent. The signal routing agent, after determining that a terminal end-point is unavailable, transmits a corresponding signal to the service node that identifies the terminal end-point being called and alerts the service node that the terminal end-point is unavailable. The service node then accesses the configuration database 24, determines the appropriate destination for the call, for example to one of the service sub-systems 18, and transmits a corresponding signal back to the signal routing agent with the appropriate output parameters, such as the address of the service sub-system to receive the call. This signaling between the signal routing agent and service node can be done through the use of call-backs, or any other similar manner.

Figure 3:
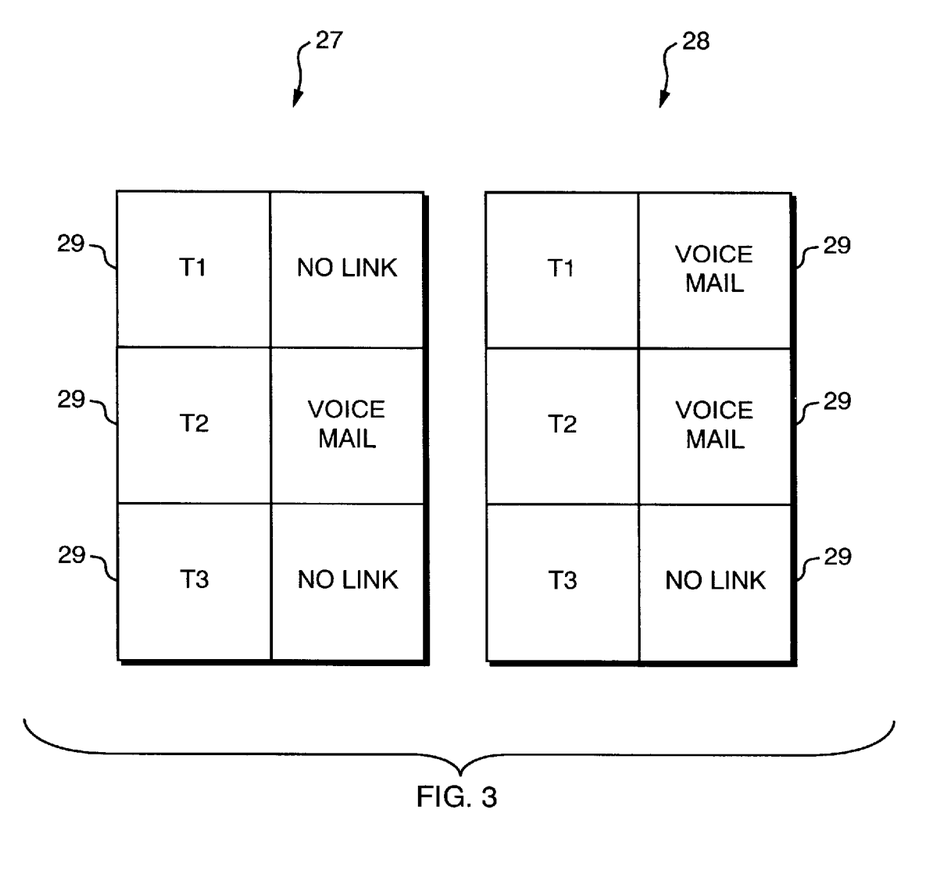
FIG. 3 is a schematic diagram of a configuration database generated and maintained by the system of FIG. 1.

The configuration database 24 in one illustrative embodiment is in the form of association or look-up tables 27 and 28 (FIG. 3). The association tables comprise plural address lines 29, each of which provides a segment to link a terminal end-point with a corresponding service sub-system 18. In the embodiment shown, the first association table 27 defines an initial call presentation table and provides links for each terminal end-point to appropriate end-points, whether they are to the terminal end-point itself (referred to as "No Link" in the figure) or to a service sub-system. The second association table 28 defines an unavailable terminal table, and provides links for each terminal end-point to the appropriate service sub-system in the event the terminal end-point is deemed unavailable, thereby indicating that a particular terminal end-point is a subscriber to the particular service, for example voice mail. Thus, the first association table is preferably accessed before an incoming call is routed to the called terminal end-point 20 to determine whether a service sub-system has been selected to receive all incoming calls directed to that terminal end-point. For example, a user at the terminal end-point, for example T2, may select to temporarily have all incoming calls routed to voice mail. Thus, the first table is dynamic and will change often. The second table is preferably accessed only after a call has been presented to a terminal end-point, and the terminal end-point fails to connect with the call within a predetermined period of time or signals to the signal routing agent a refusal to accept the call.

The entries in the first association table 27 are dynamic and may be changed frequently. For example, when a user at a terminal, such as T2, is about go on-line, he or she may select to have all incoming calls routed to the voice mail service sub-system or other service sub-system. Such information is received by the gatekeeper 14 and is stored in the appropriate field in the first association table 27. When the user logs off of the Internet, he or she may select to be presented with all incoming calls, such as users T1 and T3. This information is received by the gatekeeper, which updates the appropriate field in the first association table.

The second association table 28 is accessed only after the signal routing agent 14 determines that the terminal end-point is unavailable, either by timing out waiting for the terminal end-point to accept a call, or by being signaled by the user at the terminal end-point, as is described in greater detail below. As is shown in FIG. 3, the users T1 and T2 are subscribers to the voice mail service, and thus all calls to those terminal end-points that are not accepted will be directed to the voice messaging sub-system. T3 is not a subscriber and is not linked, and thus calls to T3 that are not answered by T3 will not be completed.

While in the embodiment disclosed there are two association tables 27 and 28 maintained by the configuration database 24, it will be understood by those of ordinary skill in the art that one association table or some other data storage method may alternatively be used, which includes the various links for each terminal end-point 20.

The network-resident service node 16 is operative to receive called party unavailable signals from the signal routing agent 14 (either the call routed gatekeeper or CCSE) and determine the appropriate manner of disposing of the call, including routing of the call to one of the service sub-systems to handle the incoming call.

It will be apparent to those skilled in the art that the service logic of the service sub-system 18 will vary depending on the type of service being offered. For example, in the case of a voice mail service, the service logic includes code for playing a prerecorded digital or analog message, preferably a message recorded by the user of the terminal end-point being called. After the message is played, the service logic accepts input from the caller, and stores the message for future playback when the user of the called terminal end-point accesses the voice mail service.

The terminal end-points 20 in one illustrative embodiment include both input and output equipment for supporting video and audio. Preferably, the terminals include graphical user interfaces (GUIs) for presenting line appearances in various formats, as is described in more detail below.

Figure 2:
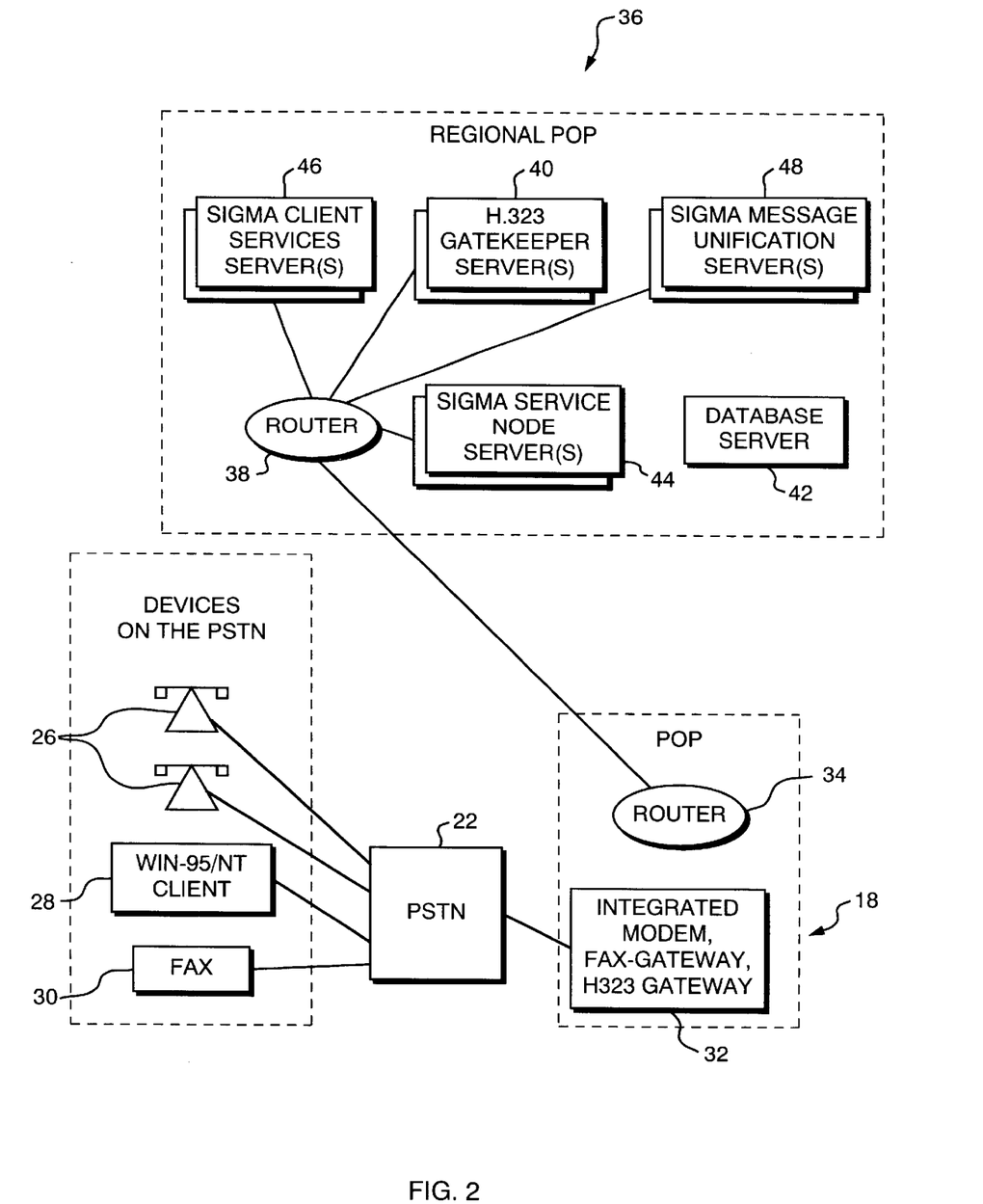
FIG. 2 is a block diagram showing various components included in the system of FIG. 1.

As shown in FIG. 2, the PSTN 22 includes a plurality of different types of devices, such as standard telephone devices 26, a "WINDOWS 95"-based and/or a "WINDOWS NT"-based client (WIN-95/NT Client) 28, and a facsimile (FAX) device 30. Each of the PSTN devices are connected to a gateway 32 preferably housed in a low-level point of presence ("POP") 18, which also includes a router 34. In one illustrative embodiment, the gateway comprises the combination of an integrated modem, a Fax-Gateway, and an H.323 Gateway, in order to communicate with the various devices of the PSTN. The low-level POP and gateway are described in greater detail in co-pending U.S. Patent Application Ser. No. 60/105,326, of Gardell et al. entitled "A HIGH SPEED COMMUNICATIONS SYSTEM OPERATING OVER A COMPUTER NETWORK", which was filed concurrently herewith, the disclosure of which is hereby incorporated by reference. Alternatively, the router 34 and gateway 32 may be housed in a central office of the PSTN or in any other suitable location.

The low-level POP 18 is preferably connected to a regional POP 36 that includes a router 38 as well as a gatekeeper server 40 programmed to control the router 38. The regional POP preferably further includes a database server 42, a sigma service node server 44, a sigma client services server 46, and a sigma message unification server 48. The sigma service node server 44 is a dedicated server for controlling the service node functions, as described in greater detail below. The sigma client services server 46 is a dedicated server for running the various client services provided by the system 10, and the message unification server 48 is a dedicated server that operates to unify messages in the message store for delivery to the user upon request.

The gatekeeper server 40 is a dedicated server for controlling gatekeeper functions as defined by the H.323 standard. In addition, other gatekeeper functions may be performed by using, for example, a Cisco H.323 gatekeeper unit as the H.323 gatekeeper server.

The database server 42 maintains persistent private branch exchange (PBX) profiles and user profiles, and also stores persistent data such as billing records pertaining to the network 10 in a database. The database server may be, for example, a "UNIX"-based computer.

The special features of the network system 10 of the present invention are implemented, at least in part, by software programs stored in memory. The software programs are accessible by the components of the system, the function of which is described in greater detail in connection with FIGS. 5 and 6.

Figure 6:
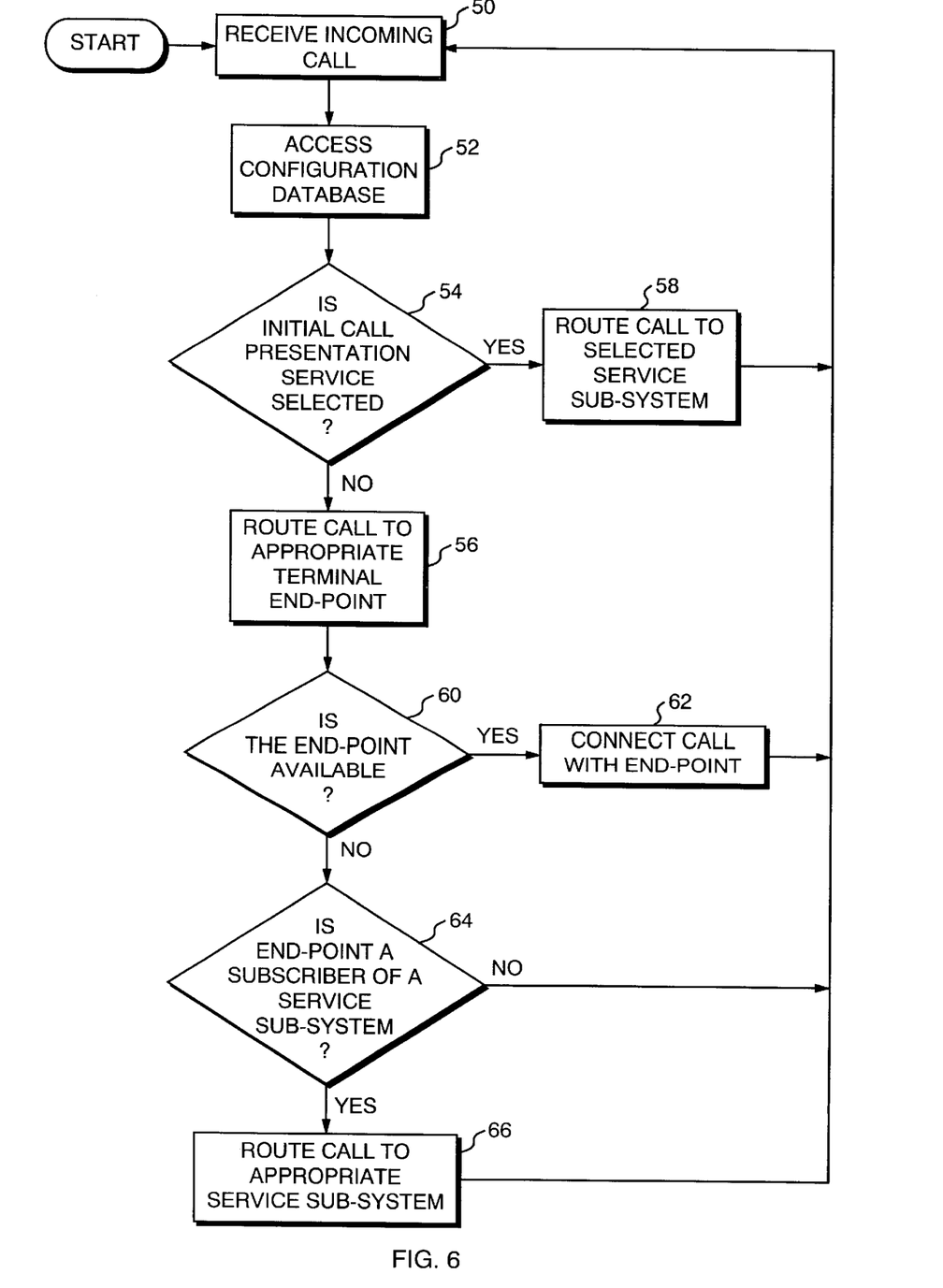
FIG. 6 is a flow chart depicting the operational flow of the systems of FIGS. 1 and 4.

Referring now to FIGS. 1 and 6, one preferred method of the present invention will be described. A call placed by a user on the PSTN 22 is transmitted to the gateway 12, at step 50. The system is preferably multi-threaded to accommodate multiple calls concurrently, but only one call will be described. Initially, the gateway performs the necessary translation of the signal into the packet based network format. Next, the translated signal is transmitted to the gatekeeper 14, which receives the signal and performs the access control function in order to authorize the call from the caller. Possible reasons for rejection may include restricted access to or from particular terminals or gateways, restricted access during certain time periods, and the like.

Assuming that the caller is authorized, operation proceeds and the gatekeeper 14 directs the gateway 12 to establish a signaling path directly to the signal routing device, in this case to the call routed gatekeeper itself. The gatekeeper receives the logical address for the call through the gateway. The gatekeeper then accesses a database and uses the logical address to determine the corresponding terminal IP address. In one illustrative embodiment, the gatekeeper then signals the service node 16, which accesses the first association table 27 of the configuration database 24 at step 52. At step 54, the service node searches the first association table for the, address line 29 corresponding to the called terminal end-point 20 to determine whether a service sub-system, such as the voice mail service sub-system, has been linked with that terminal end-point, which is the case when the user at the terminal end-point has communicated to the system 10 that he or she wishes all calls be directed to voice mail. If no service sub-system is linked with the terminal end-point in the first association table, then operation proceeds to step 56, and the call is routed to the terminal end-point and presented to the user. If, on the other hand, the voice mail service sub-system is linked with the terminal end-point in the first association table, operation instead proceeds to step 58, and the call is routed to the service sub-system, which handles the incoming call. In that event, operation then proceeds back to step 50, and the system 10 handles the next incoming call.

If the call is routed to the terminal end point 20, operation flows to step 60, and the signal routing agent 14 monitors whether the call is accepted by the terminal end-point 20. For example, the signal routing agent may monitor whether an alert or connect signal is received from the terminal end-point within a predetermined period of time. If so, the call is completed at step 62, operation flows back to step 50, and the system 10 handles the next incoming call. If the call is not accepted within a predetermined period of time, for example ten seconds, or if the user at the terminal end-point indicates to the signal routing agent that he or she refuses to accept the call, operation proceeds to step 64, and the system determines if the terminal end-point is a subscriber of the voice mail (or other) sub-system 18 possibly by checking the second association table 28. If not, the call goes unanswered, and operation proceeds back to step 50. If the terminal end-point is a subscriber, then at step 66 the signal routing agent automatically connects the incoming call with the voice mail (or other) service sub-system for disposition of the call. Operation then proceeds to step 51, and the system is done with that incoming call.

Figure 4:
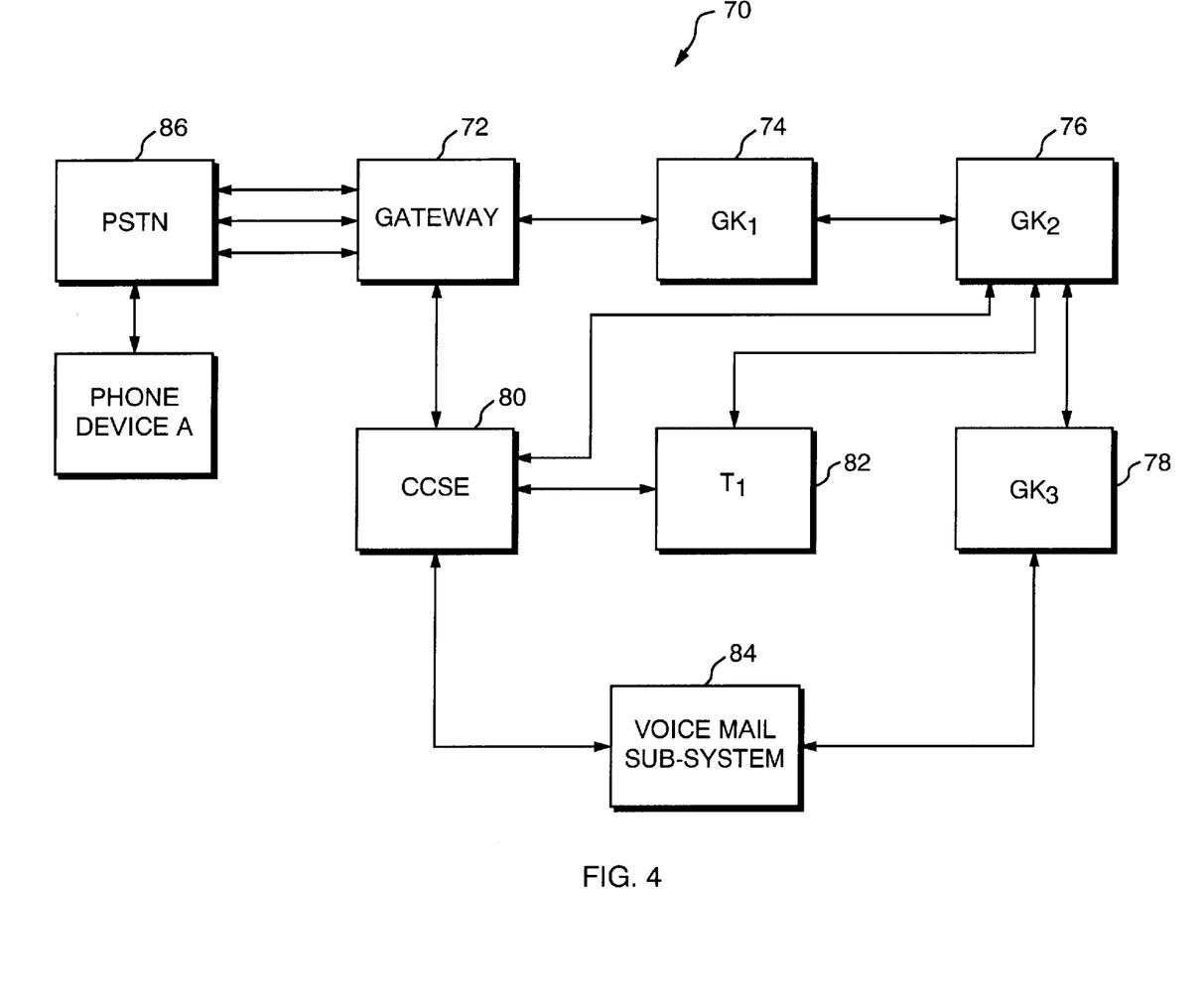
FIG. 4 is a block diagram of an alternative embodiment of the system of the present invention.

Referring now to FIG. 4, there is shown a second illustrative embodiment of the network system 70 of the present invention. The network system comprises a gateway 72, plural gatekeepers 74, 76, and 78, a CCSE 80 which serves as the signal routing agent in this embodiment, at least one terminal end-point 82 ("T1"), and a network-resident voice mail service sub-system 84. The gateway 72 is in communication with a PSTN 86 for two-way communication therebetween, as described above in connection with the first described embodiment. Alternatively, instead of being in communication with the PSTN, it will be understood by those of ordinary skill in the art that the gateway could be in communication with another PBN, some other SCN, or directly with other IP devices.

The first gatekeeper 74 is in communication with the gateway 72 to receive a translated called party address from the gateway. The first gatekeeper 74 is operative to multicast a location request to plural gatekeepers (only the affirmatively responding gatekeeper 76 is shown in FIG. 4) to locate the gatekeeper that services a particular dialed number, as is described in greater detail below.

The CCSE 80 is also connected to the gateway 72 for communication therewith, as well as with the affirmatively responding gatekeeper 76. The CCSE serves as the signal routing agent for the call signals, and communicates directly with the gateway after the second gatekeeper 76 responds to the first gatekeeper 74 with the address of the CCSE. As with the previous embodiment, a call routing gatekeeper can be used in the place of the CCSE. The CCSE is also in communication with the terminal end-point T1, and with the network-resident voice mail service sub-system 84.

The second gatekeeper 76 is also in communication with terminal end-point T1, and with a third gatekeeper 78. The third gatekeeper, in turn, is connected with the network-resident voice mail service sub-system 84.

Figure 5:
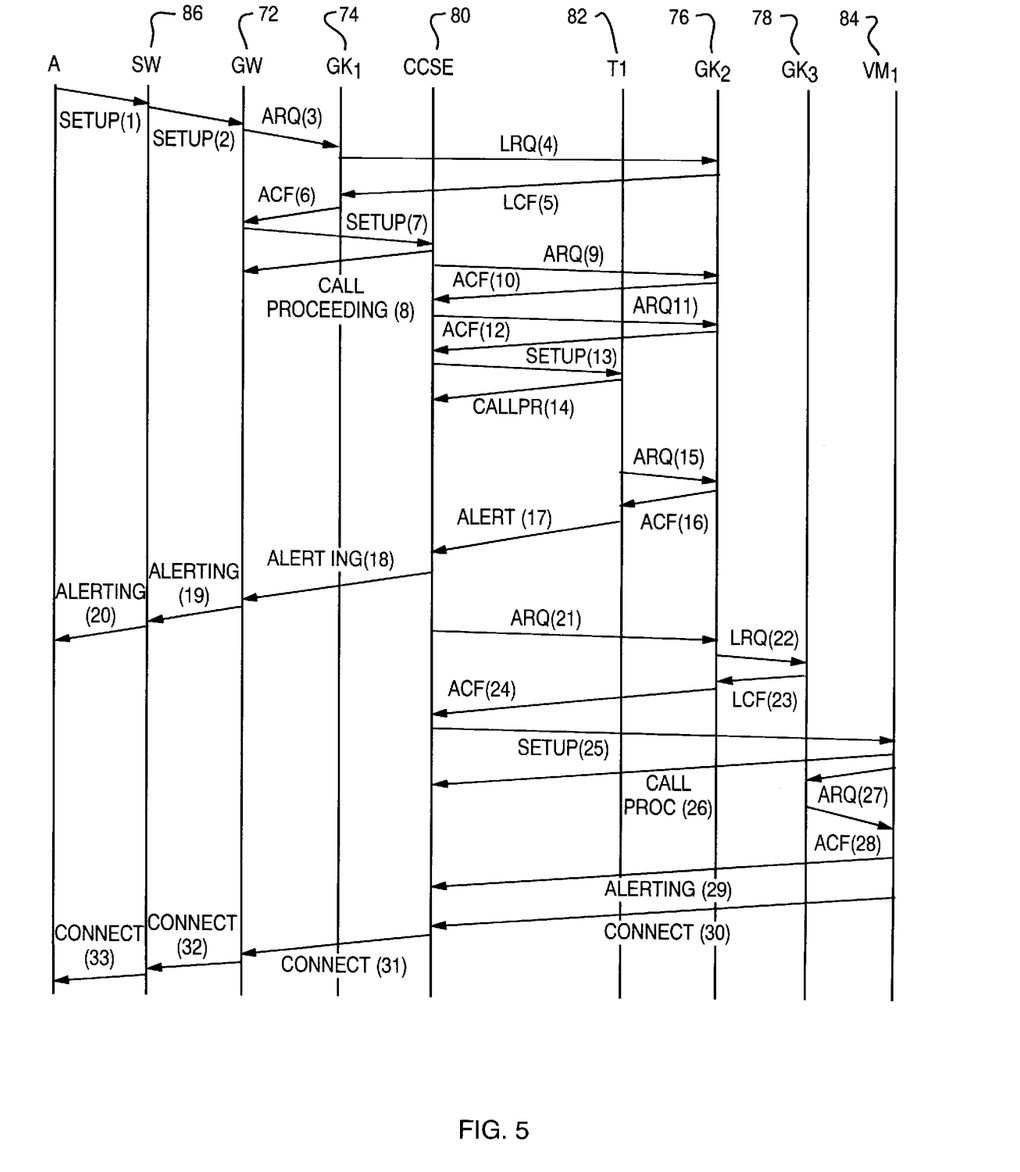
FIG. 5 is a timing diagram for the signaling sequence of the system of FIG. 4.

Referring to FIG. 5, there is shown a timing diagram for the signaling involved according to one illustrative embodiment of the present invention, namely when an incoming call is not answered at the called party's terminal end-point within a predetermined amount of time, or when the called party signals the CCSE that he or she does not wish to accept the call. An outgoing call placed from a telephone device A in, for example, the PSTN 86 is transmitted as a Setup signal (1) through the PSTN local exchange carrier (LEC) switching network (SW), and to the gateway 72 as a Setup signal (2). The gateway then transmits an admission request signal ARQ (3) that is received by the first gatekeeper 74. The first gatekeeper then multicasts a location request signal LRQ (4) to locate the gatekeeper that services the number dialed by the telephone device A. The second gatekeeper 76, which services the dialed number, then transmits a location confirmation signal LCF (5) back to the first gatekeeper 74, informing the first gatekeeper as to the location of the corresponding terminal end-point. The first gatekeeper then transmits an admission confirmation signal ACF (6) to the gateway 72 along with the IP address of the corresponding signal routing agent, in this case the CCSE 80, that services the number dialed. The ACF signal (6) also serves to direct the gateway to establish a direct signaling path to the CCSE.

The gateway 72 then transmits a setup signal (7) to the CCSE 80, corresponding to step 50 in FIG. 6. The CCSE responds with a Call Proceeding signal (8) transmitted back to the gateway to inform the gateway that the CCSE is attempting to contact the intended called party's terminal end-point. The CCSE then transmits a signal, ARQ (9), to the second gatekeeper 76 requesting that a communication path be established with the terminal end-point T1. If the call is authorized, the second gatekeeper 76 then transmits an ACF signal, ACF (10), back to the CCSE authorizing the CCSE to communicate directly with the end-point T1. A second ARQ signal (11) is transmitted by the CCSE to the second gatekeeper, which responds with a second ACF signal (12). The first ARQ signal, ARQ(9), is an admissions check for the incoming call, and the second ARQ signal, ARQ(11), is an attempt to map an H.323 alias, determined from the information input by the calling party, to an IP address in order to complete the call.

Once the IP address is determined, the CCSE 80 then transmits a setup signal, Setup (13), to T1, which in one illustrative embodiment appears in the form of a line appearance at the graphical user interface ("GUI") of T1. If the user at terminal end-point T1 is already involved in a conversation with another caller, the line appearance may be in the form of a popup screen or the like, as described in greater detail in co-pending U.S. patent application Ser. No. 09/177, 700 of Gardell et al. entitled "MUILTI-LINE APPEARANCE TELEPHONY VIA A COMPUTER NETWORK", which was filed concurrently herewith, and which is incorporated herein by reference. The terminal T1 transmits a Call proceeding signal (14) back to the CCSE to inform the CCSE that the call is being placed. The terminal end-point T1 then transmits an ARQ signal, ARQ (15), to the second gatekeeper 76. The gatekeeper responds with an ACF signal, ACF (16), which includes the call signaling channel transport address of the CCSE for direct communication between the terminal end-point and the CCSE. The end-point T1 then transmits an alert signal, Alert (17), directly to the CCSE indicating that the call is proceeding and is being presented at terminal end-point T1. Respective alert signals (Alert (18), Alert (19), and Alert (20)) are transmitted through the gateway 72 and PSTN 86 to the caller's telephone device A, such as in the form of audible ringing as is well known.

The CCSE 80 is then programmed to wait for a predetermined period of time for the terminal end-point T1 to accept the call, corresponding to step 60 in FIG. 6. If, after the predetermined amount of time has elapsed, the CCSE has not received a connect signal from the terminal end-point, a service node (not shown) or the CCSE may be programmed to access the second association table 28 to determine if the terminal end-point T1 is linked to the voice mail service sub-system 84, corresponding to step 64 in FIG. 6. Alternatively, while the call is being placed, the called party may signal the CCSE to route the call to voice mail with any preselected signal, such as by depressing one or more buttons on a keypad or clicking on an icon on the GUI with the mouse or the like.

Assuming the predetermined amount of time elapses and the terminal end-point 20 is associated with the voice mail sub-system $VM_1$ 84, the CCSE 80 then automatically transmits an appropriate ARQ signal, ARQ(21), to the second gatekeeper 76 seeking to establish communication with the voice mail sub-system $VM_1$. Thus, in the illustrative embodiment the system 70 automatically defaults to the voice mail sub-system if the called party does not accept the call or signal the CCSE to route the call to voice mail. In this case, the second gatekeeper then transmits a LRQ signal, LRQ(22), which is responded to by the third gatekeeper 78 in the form of a LCF signal, LCF(23), which informs the second gatekeeper as to the location and IP address of the voice mail sub-system. The second gatekeeper then transmits an admission confirmation signal, ACF (24), to the CCSE 80 with the IP address of $VM_1$. The ACF signal (24) also serves to direct the CCSE to establish a direct signaling path to $VM_1$. The CCSE then communicates directly with $VM_1$ in the form of a Setup signal (25), corresponding to step 66 in FIG. 6. $VM_1$ responds with a signal, CallProceeding (26), back to the CCSE, and transmits a signal ARQ(27) to the third gatekeeper 78. The third gatekeeper transmits a corresponding signal ACF(28) to $VM_1$, which responds with a signal Alert(29) to the CCSE 80, followed by a signal Connect (30) which is received by the CCSE. The CCSE then transmits a signal Connect(31) to the gateway 72, which sends a signal Connect(32) to the PSTN switch SW, which in turn transmits a signal Connect(33) to the caller's communication device A, thereby establishing a communication channel between the caller and $VM_1$, such that the caller is informed that the called party is unavailable and is prompted to leave a voice mail message for the called party.

In one illustrative embodiment, before the ARQ signal (9) is transmitted by the CCSE 80, the CCSE 80 or a service node (not shown) signaled by the CCSE may access the first association table 27 of the configuration database 24 to determine whether the terminal end-point T1 is linked with a service sub-system such as voice mail for initial call presentation. If so, the next signal transmitted is the ARQ signal (21) to the second gatekeeper 76. If not, the signaling proceeds as shown in FIG. 5 and as described above.

It will be understood by those of ordinary skill in the art that the user may be signaled regarding an incoming call in various different manners. One illustrative embodiment includes an interactive interface, for example in the form of a pop-up screen on the graphical user interface, which alerts the user that a caller seeks to connect with the user. The system may include icons on the screen corresponding, respectively, to an acceptance of the call and routing of the call to voice mail, which may be clicked by a mouse as is well known in the art, and which is shown in co-pending application Ser. No. 09/177,700, which has been incorporated herein by reference.

Thus, the system 10 of the present invention allows users to elect call disposition, either before any calls are received (with the election being stored in the association table 27 of the configuration database 24) or when a caller is attempting to connect to the user. The user has the option of accepting the call, or having the call routed to the voice mail sub-system 18 for call disposition.

In another illustrative embodiment of the present invention, the system 10 is operative to automatically forward facsimile messages to the voice and fax messaging sub-system 18 when the user's phone line is in use. For example, when the user logs onto the Internet or other network via a modem, a "transfer on busy" signal is generated by the PSTN 22, as is well known in the art. Then, when the signal routing agent 14 of the system 10 attempts to connect a call with the user, the signal routing agent receives the "transfer on busy" signal from the PSTN via the gateway 12. The signal routing agent is programmed to recognize that signal from the PSTN and to automatically redirect the facsimile data to the data store of the sub-system 18. Later, when the user is no longer on-line, the user may signal the signal routing agent to retrieve the data from the data store and begin transmitting the data to the user's facsimile device.

From the foregoing, it will be apparent that the network system 10 of the present invention modifies existing computer network-based communications systems to provide a network presence in the event a terminal end-point is unavailable, and provides various services at the network level rather than at the client level.

While the invention has been particularly shown and described with reference to preferred embodiments thereof, it will be understood by those skilled in the art that various changes in form and details may be made therein without departing from the spirit and scope of the invention.

What is claimed is:

1. A communication system for operating over a computer network and for interacting with a switched circuit network, the system comprising:
   a gateway in communication with the switched circuit network, the gateway being operative to translate switched circuit network-compatible signals into computer network-compatible signals;
   an association table associating a plurality of terminal end-points with one or more network-resident service sub-systems; and
   a signal routing agent in communication with the gateway and with the terminal end-points, the signal routing agent being operative to receive incoming calls from the gateway addressed to respective ones of the terminal end-points and programmed to route the calls to the respective terminal end-points, the signal routing agent being responsive to one of the terminal end-points being unavailable to automatically route a corresponding call to one of the network-resident service sub-systems using the association table.

2. The system of claim 1, wherein the signal routing agent is responsive to receipt of a preselected signal from one of the terminal end-points being called and the gateway to automatically route a corresponding call to the network-resident service sub-system.

3. The system of claim 1 further including a service node in communication with the signal routing agent, the service node being responsive to receipt of an identity of an intended called party to determine an appropriate destination for calls directed to the intended called party in the event the called party is unavailable.

4. The system of claim 1 wherein the incoming call is in the form of a facsimile message, and wherein the signal routing agent is programmed to determine if the one terminal end-point is in use and, if so, to route the facsimile message to the service sub-system.

5. The system of claim 1, wherein the signal routing agent and gateway are H.323-defined entities.

6. The system of claim 1, wherein the signal routing agent comprises a call control service entity.

7. The system of claim 1, wherein the signal routing agent comprises a call routed gatekeeper.

8. The system of claim 1, wherein the signal routing agent is programmed to determine if the one terminal end-point is unavailable by placing a call to the one terminal end-point and waiting for a predetermined amount of time.

9. A communication system for operating over a computer network and for interacting with a switched circuit network, the system comprising:
   a gateway in communication with the switched circuit network, the gateway being operative to translate switched circuit network-compatible signals into computer network-compatible signals; and
   a signal routing agent in communication with the gateway and with a plurality of terminal end-points, the signal routing agent being operative to receive incoming calls from the gateway addressed to respective ones of the terminal end-points and programmed to route the calls to the respective terminal end-points, the signal routing agent being responsive to one of the terminal end-points being unavailable to automatically route a corresponding call to a preselected network-resident service sub-system, the signal routing agent being programmed to determine if the one terminal end-point is unavailable by accessing, before forwarding the corresponding call to the one terminal end-point, an association table listing the one terminal end-point and an associated call destination.

10. A communication system for operating over a computer network and for interacting with a switched circuit network, the system comprising:
    a gateway in communication with the switched circuit network, the gateway being operative to translate switched circuit network-compatible signals into computer network-compatible signals;
    a signal routing agent in communication with the gateway and with a plurality of terminal end-points, the signal routing agent being operative to receive incoming calls from the gateway addressed to respective ones of the terminal end-points and programmed to route the calls to the respective terminal end-points, the signal routing agent being responsive to one of the terminal end-points being unavailable to automatically route a corresponding call to a network-resident service sub-system;
    a configuration database associating the respective terminal end-points with one or more network-resident service sub-systems; and
    a service node in communication with the signal routing agent and responsive to receipt of a signal from the signal routing agent corresponding to the one terminal end-point to access the configuration database, determine an associated one of the one or more network-resident service sub-systems to receive the corresponding call, and to signal the signal routing agent to route the corresponding call to the associated network-resident service sub-system.

11. The system of claim 10 wherein:
    the configuration database is in the form of an association table.

12. A method for disposing of incoming calls in a packet based network, comprising:
    storing an association table that associates a plurality of terminal end-points with one or more network-resident service nodes;
    receiving one of the incoming calls addressed to a particular one of the terminal end-points;
    routing the one incoming call to the terminal end-point;
    determining whether the terminal end-point is unavailable to receive the one incoming call;
    if the terminal end-point is unavailable, determining an appropriate one of the network-resident service nodes to receive the one incoming call based on the association table; and
    routing the one incoming call to the appropriate network-resident service node.

13. The method of claim 12 wherein the step of determining whether the terminal end-point is unavailable comprises monitoring whether the terminal end-point accepts the one incoming call within a preselected time period.

14. A method for disposing of incoming calls in a packet based network, comprising:

receiving one of the incoming calls addressed to a particular terminal end-point;

routing the one incoming call to the terminal end-point;

determining whether the terminal end-point is unavailable to receive the one incoming call by accessing a configuration database to determine if the terminal end-point is associated with a network-resident service sub-system, the accessing being performed a preselected amount of time after routing the one incoming call to the terminal end-point;

if the terminal end-point is unavailable, determining an appropriate network-resident service sub-system to receive the one incoming call; and routing the one incoming call to the appropriate network-resident service node.

15. A method for disposing of incoming facsimile messages in a packet based network, comprising:

storing an association table that associates a plurality of terminal end-points with one or more message stores;

receiving one of the incoming facsimile messages addressed to a particular one of the terminal end-points;

determining if a line corresponding to the terminal end-point is in use;

if the line is in use, routing the one incoming facsimile message to the message store associated with the terminal end-point in the association table; and if the line is not in use, routing the one incoming facsimile message to the terminal end-point.

16. A communication system for operating over a computer network and for interacting with a switched circuit network, the system comprising:

a gateway in communication with the switched circuit network, the gateway being operative to translate switched circuit network-compatible signals into computer network-compatible signals;

an association table associating a plurality of terminal end-points with one or more network-resident service sub-systems; and a signal routing agent in communication with the gateway and with the terminal end-points, the signal routing agent being operative to receive incoming calls from the gateway addressed to respective ones of the terminal end-points and programmed to determine whether the respective terminal end-points are unavailable, the signal routing agent being responsive to one of the terminal end-points being unavailable to automatically route one of the incoming calls to a preselected one of the network-resident service sub-systems when the association table indicates that the preselected network-resident service sub-system is associated with the one terminal end-point.

17. The system of claim 16 further including a service node in communication with the signal routing agent, the service node being responsive to receipt of an identity of an intended called party to determine an appropriate destination for calls directed to the intended called party in the event the called party is unavailable.

18. The system of claim 16 wherein the service sub-system comprises a voice and facsimile messaging sub-system.

19. The system of claim 16, wherein the signal routing agent and gateway are H.323-defined entities.

20. The system of claim 16, wherein the signal routing agent comprises a call control service entity.

21. The system of claim 16, wherein the signal routing agent comprises a call routed gatekeeper.

22. The system of claim 16, wherein the signal routing agent is programmed to determine if the one terminal end-point is unavailable, before routing a call to the one terminal end-point, by accessing the association table linking the one terminal end-point and an associated call destination for initial call presentation.

23. The system of claim 16, wherein the signal routing agent is programmed to determine if the one terminal end-point is unavailable by placing a call to the one terminal end-point and monitoring whether the one terminal end-point accepts the call within a predetermined amount of time.

24. The system of claim 16 and further including:

a configuration database associating the respective terminal end-points with respective service sub-systems; and a service node in communication with the signal routing agent and responsive to receipt of a signal from the signal routing agent identifying one of the terminal end-points to access the configuration database, determine a corresponding service sub-system to receive the one incoming call, and to signal the signal routing agent to route the one incoming call to the corresponding service sub-system.

25. The system of claim 24, wherein the configuration database includes the association table.

26. The system of claim 24, wherein the configuration database comprises an initial call presentation database and the association table, and the service node is responsive to receipt of an initial call presentation signal from the signal routing agent to access the initial call presentation database to determine an appropriate destination for the one incoming call, and responsive to receipt of a second signal from the signal routing agent to access the association table to determine the appropriate destination for the one incoming call.

27. A method for disposing of incoming calls in a packet based network, comprising:

receiving an incoming call addressed to a particular terminal end-point;

accessing an initial call presentation database to determine an appropriate destination for the incoming call;

routing the incoming call to the terminal end-point, if the terminal end-point is the appropriate destination for the incoming call;

routing the incoming call to a service sub-system, if the service sub-system is the appropriate destination for the incoming call;

determining whether the terminal end-point is unavailable to receive the incoming call, if the call is routed to the terminal end-point;

determining an appropriate network-resident service sub-system to receive the call, if the terminal end-point is unavailable; and routing the incoming call to the appropriate network-resident service sub-system.

28. A communication system in a packet-based network, comprising:

a database configured to store routing instructions;

a signal routing agent configured to receive destination addresses for signals from a switched circuit network destined for terminal end-points in the packet-based network, and identify ones of the terminal end-points based on the destination addresses; and a service node configured to receive indications of the identified terminal end-points from the signal routing agent, determine whether to route the signals to the identified terminal end-points based on the routing instructions in the database, and instruct the signal routing agent to transmit the signals based on a result of the determination.

29. The communication system of claim 28, wherein the database includes:
   a presentation table configured to identify destinations to receive signals directed to corresponding ones of the terminal end-points.

30. The communication system of claim 29, wherein at least one of the destinations identifies a network-resident service sub-system.

31. The communication system of claim 28, wherein the signal routing agent is further configured to contact the identified terminal end-points and determine whether the identified terminal end-points are available.

32. The communication system of claim 31, wherein the database includes:
   a presentation table configured to identify alternate destinations corresponding to each of the terminal end-points.

33. The communication system of claim 32, wherein the service node is further configured to access the presentation table to identify alternate destinations corresponding to unavailable ones of the terminal end-points and instruct the signal routing agent to transmit the signals to the alternate destinations.

34. The communication system of claim 33, wherein the alternate destinations include at least one network-resident service sub-system.

35. The communication system of claim 28, wherein the signals include at least one of voice calls and facsimile messages.

36. The communication system of claim 28, wherein the signal routing agent is further configured to contact the identified terminal end-points, determine whether the identified terminal end-points are available, and direct the signals corresponding to unavailable terminal end-points to at least one service sub-system.

* * * * *